United States Patent [19]

Caero

[11] Patent Number: 5,092,539
[45] Date of Patent: Mar. 3, 1992

[54] JAM RESISTANT BALL SCREW ACTUATOR

[75] Inventor: Jose G. Caero, Arlington, Va.

[73] Assignee: Bell Helicopter Textron Inc., Fort Worth, Tex.

[21] Appl. No.: 421,087

[22] Filed: Oct. 13, 1989

[51] Int. Cl.⁵ .................................. B64C 15/00
[52] U.S. Cl. .................. 244/75 R; 74/424.8 R; 74/89.15; 254/102
[58] Field of Search .................. 244/75 R, 213; 74/424.8 R, 89.15; 254/102

[56] References Cited

U.S. PATENT DOCUMENTS

| 2,660,028 | 11/1953 | Geyer | 74/424.8 R |
|---|---|---|---|
| 3,203,269 | 8/1965 | Perrine | 74/424.8 R |
| 3,213,702 | 10/1965 | Deehan et al. | 74/424.8 R |
| 3,404,581 | 10/1968 | Kraus | 74/424.8 R |
| 3,501,114 | 12/1967 | De Plante | 254/102 |
| 3,763,747 | 10/1973 | Beichel et al. | 74/424.8 R |
| 4,603,594 | 8/1986 | Grimm | 74/89.15 |
| 4,637,272 | 1/1987 | Teske et al. | 244/75 R |
| 4,745,815 | 5/1988 | Klopfenstein | 74/424.8 R |

FOREIGN PATENT DOCUMENTS 966698  4/1975  Canada.
314951 11/1971  U.S.S.R. ................ 74/424.8 R Primary Examiner—Joseph F. Peters, Jr.
Assistant Examiner—Christopher P. Ellis
Attorney, Agent, or Firm—Richards, Medlock & Andrews

[57] ABSTRACT

An actuator (10) is disclosed for movement between a retracted position and an extended position. The actuator (10) can be used to pivot a pylon (14) in a tilt rotor aircraft relative to the aircraft wing (12) between a helicopter mode and an aircraft mode. The actuator (10) is provided with an inner ball screw drive unit (20) and an outer ball screw drive unit (22) which provides for limited motion should one of the drive units jam. Further, the actuator (10) can be operated from either end of the actuator. Each ball screw (28, 52) in the actuator is associated with a tube (30, 54), preferably of carbon fiber composite, which forms a secondary load path if the screw fails.

7 Claims, 5 Drawing Sheets

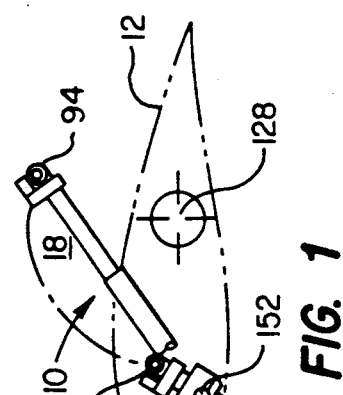
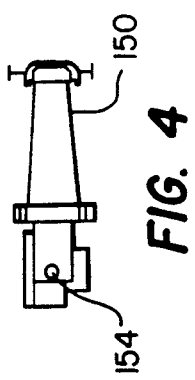
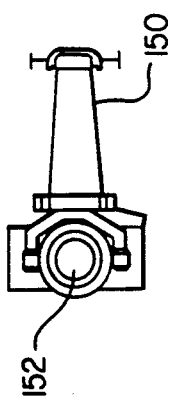
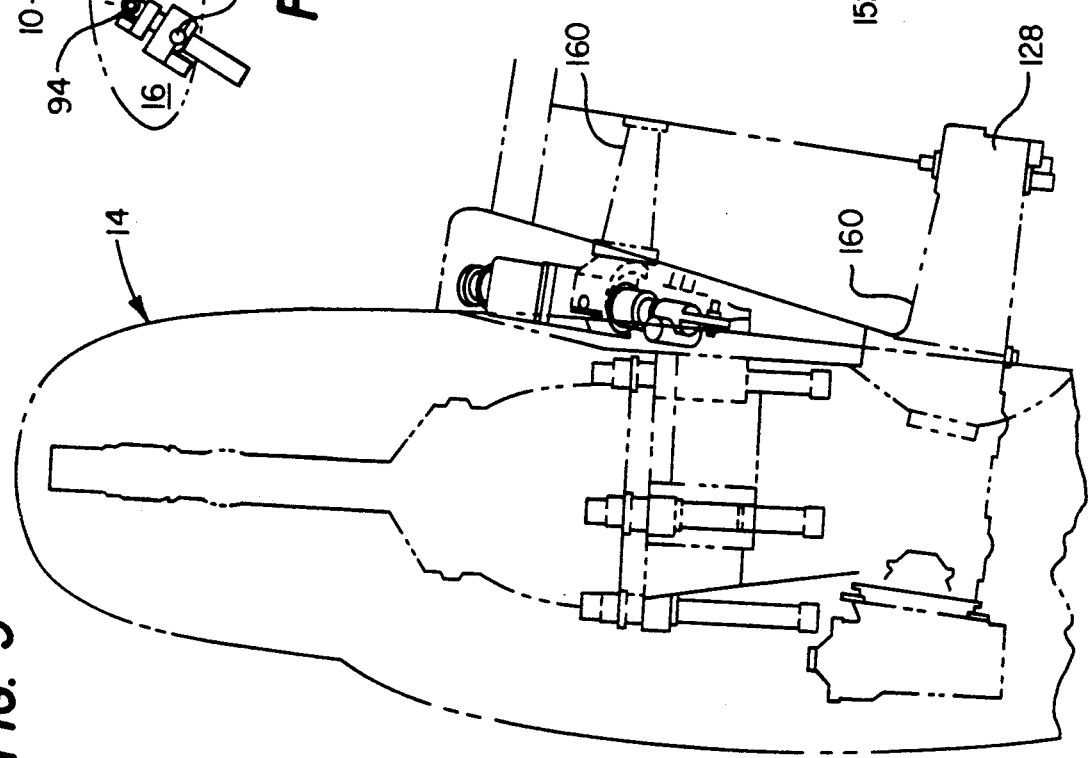
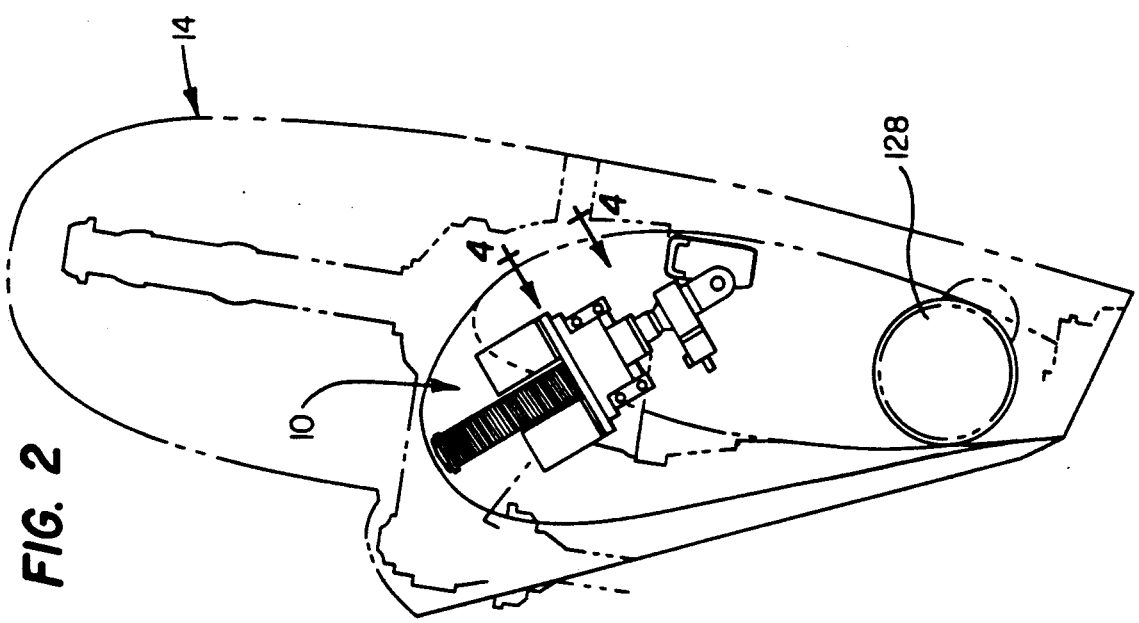

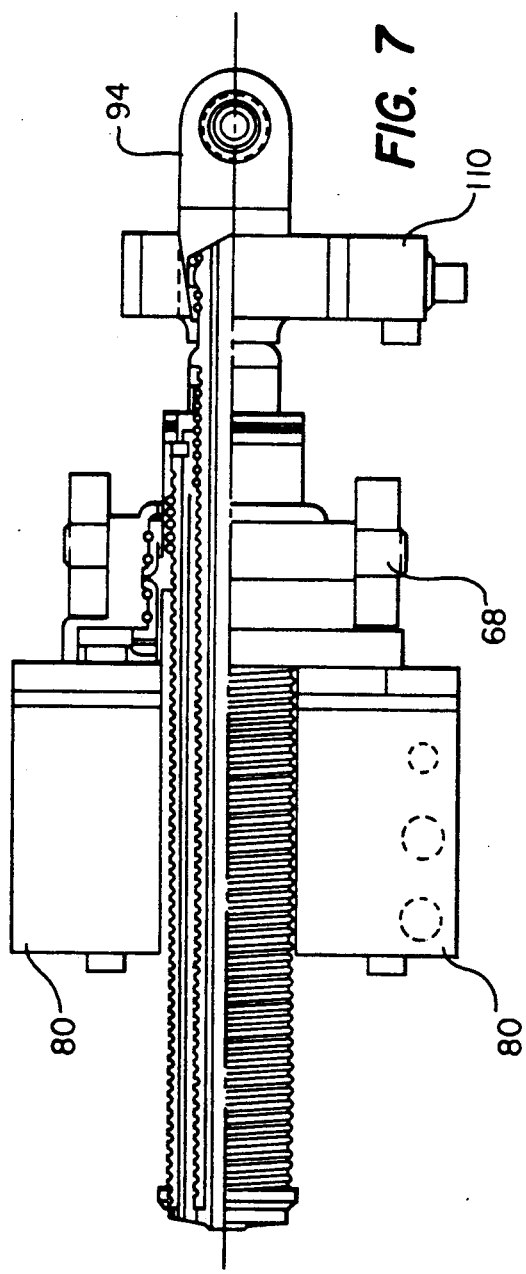
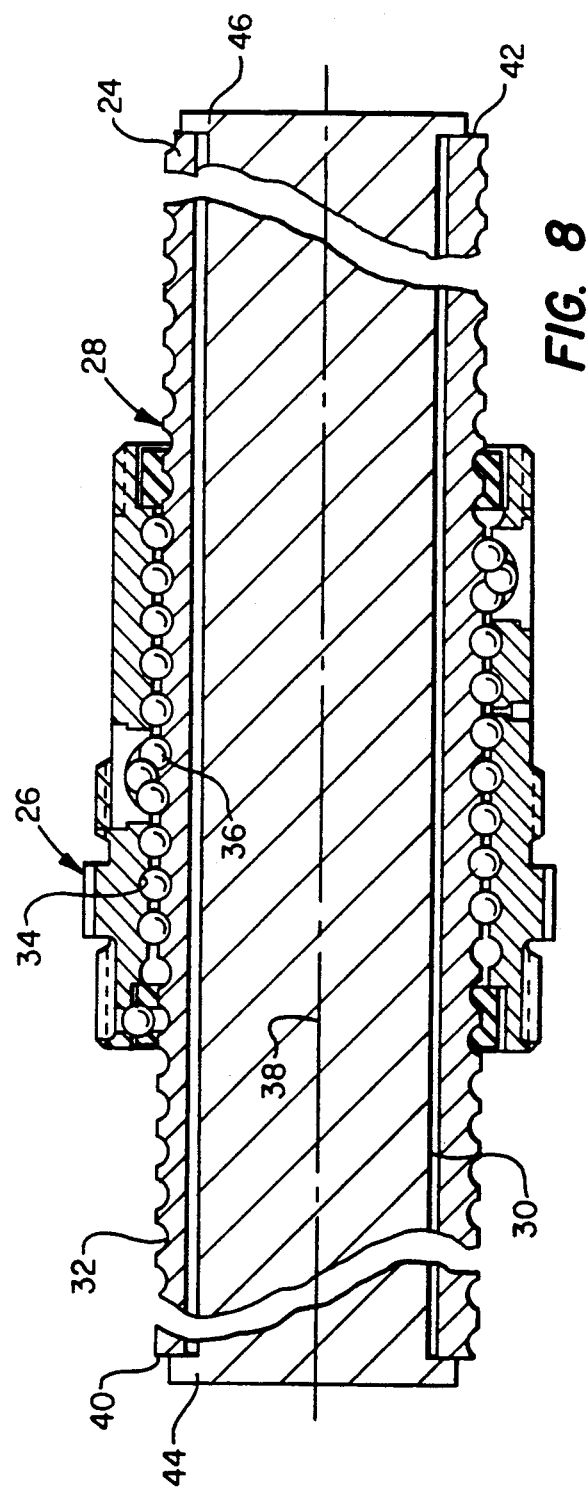

JAM RESISTANT BALL SCREW ACTUATOR

This invention was made with Government support under N00019-83-C-0166 awarded by Department of the Navy, Naval Air Systems Command. The Government has certain rights in this invention.

TECHNICAL FIELD

This invention relates to the field of actuators, and in particular to an actuator for moving a pylon in an aircraft.

BACKGROUND OF THE INVENTION

In aircraft design, many actuators are required to move certain movable elements of the craft relative to other reaction elements. One example of such a use is in the actuation of flaps on a conventional fixed wing aircraft. As in any aircraft environment, the actuator would ideally be extremely reliable, lightweight, compact, and require a minimum energy input for actuation, among other requirements.

The ball screw actuator is commonly employed in aircraft applications. Simply put, a ball screw actuator includes a nut with internal threads and a screw with external threads. A plurality of spherical balls are captured within the threads of the nut and engage the threads on the screw. Rotation of the nut about its center axis while resisting similar rotation of the screw will cause the screw to move axially through the nut.

Clearly, the nut could be mounted on a reaction element and the screw on a moving element in an aircraft to form an actuator. While the ball screw actuator is much less resistant to jamming than a simple threaded engagement between a nut and a screw, jamming can occur. Further, balls may be lost from the nut, reducing or eliminated the ability to translate the screw axially. Further, the screw may be the only fixed connection between the moving element and the reaction element and, should the screw crack apart, catastrophic results could ensue.

In recent years, an aircraft has been under development which is commonly referred to as a tilt rotor aircraft. In this aircraft, a rotor or propeller, and its associated power plant, is mounted on a pylon which can pivot on the aircraft between a conventional flight mode and a helicopter mode. In the conventional flight mode, the propeller rotates in a vertical plane to drive the aircraft forward as in a conventional prop driven aircraft. However, the pylon and propeller can then be converted or pivoted to position the propeller in essentially a horizontal plane, where it can act as a helicopter rotor and the aircraft operated as a helicopter for vertical takeoff and landing. In such an environment, a highly reliable and efficient actuator is necessary for the proper operation of the pylon in converting between the aircraft mode and the helicopter mode.

SUMMARY OF THE INVENTION

In accordance with one aspect of the present invention, a ball screw actuator is provided positioned between a first element and a second element. The actuator includes a first ball screw drive unit including a first nut having a ball track and a first screw having a ball track and a plurality of drive balls engaged in the ball tracks of said first nut and said first screw to support the nut and screw concentric to one another about a first axis, relative rotation between the first nut and first screw about the first axis causing relative movement therebetween along the first axis. A second ball screw drive unit is provided which includes a second nut having a ball track and a second screw having a ball track and a plurality of drive balls engaged in the ball tracks of said second nut and said second screw to support the second nut and second screw concentric to one another about a second axis, relative rotation between the second nut and second screw about the second axis causing relative movement therebetween along the second axis. The first nut is mounted to the first element for rotation about the first axis. The second screw is mounted to the second element for rotation about the second axis. The first screw and second nut are fixed together with the first and second axes coincident for joint rotation.

In accordance with another aspect of the present invention, a ball screw actuator is provided for positioning between a first element and a second element. The actuator includes a nut having a ball track and a screw having a ball track. A plurality of drive balls are engaged in the ball tracks of said nut and screw to support the nut and screw concentric to one another about a first axis. Relative rotation between the nut and screw about the first axis causing relative movement therebetween along the first axis. The screw has first and second ends. The invention further comprises a member extending along the screw and confining the ends of the screw to form a redundant load path.

BRIEF DESCRIPTION OF THE DRAWINGS

For a more complete understanding of the present invention, reference is now made to the following description, taken in conjunction with the accompanying drawings, in which:

FIG. 1 is an illustrative view of the range of motion of an actuator forming a first embodiment of the present invention to convert a pylon between an aircraft mode and a helicopter mode;

FIG. 2 is a vertical cross sectional view of the actuator and pylon in the aircraft mode;

FIG. 3 is a horizontal cross sectional view of the pylon and actuator in the aircraft mode;

FIG. 4 is a cross section of an element of the actuator taken along lines 4—4 in FIG. 2;

FIG. 5 is a side view of the element in FIGURE 4;

FIG. 7 is a schematic illustration of the actuator;

FIG. 8 is an illustrative cross sectional view of the inner ball screw assembly of the actuator;

DETAILED DESCRIPTION

Figure 6:
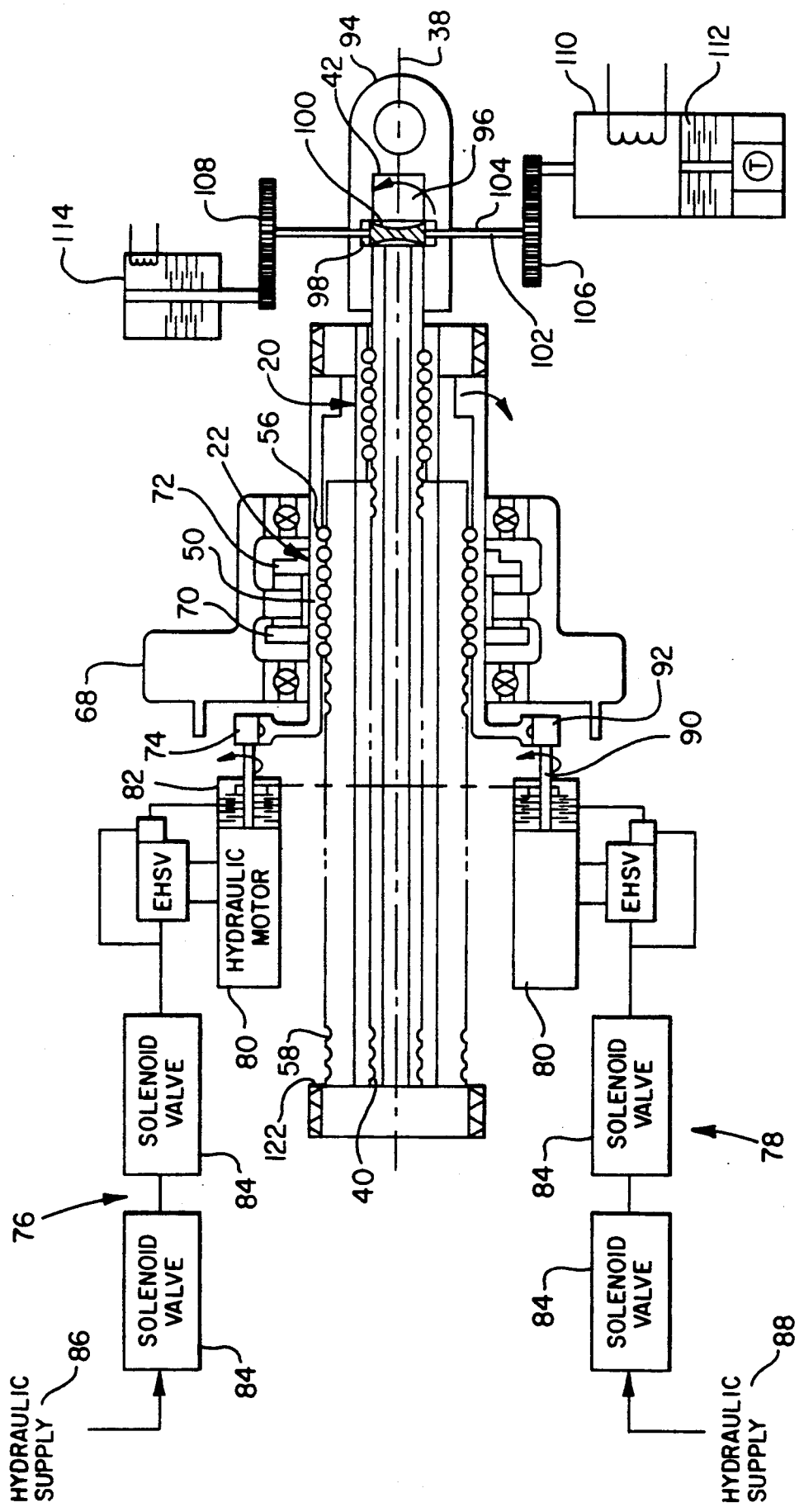
FIG. 6 is a schematic illustration of the actuator.
Figure 9:
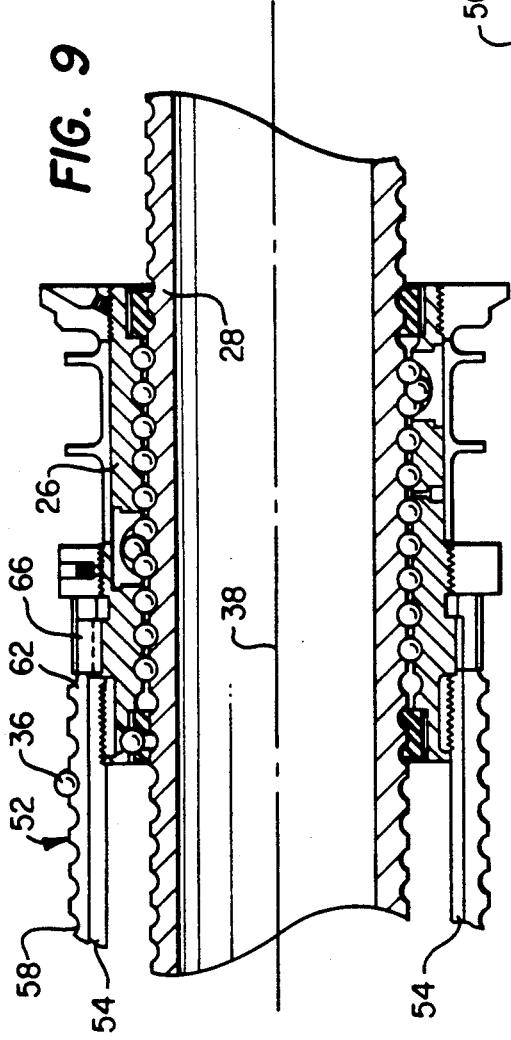
FIG. 9 is an illustrative cross sectional view of the inner ball screw assembly and outer ball screw of the actuator.
Figure 10A:
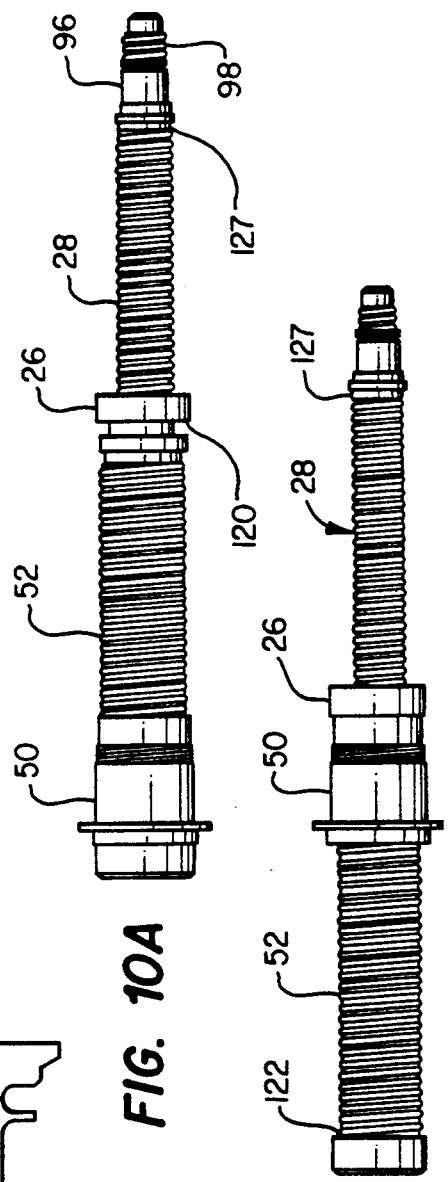
FIG. 10A-10C illustrates the range of motion of the actuator.
Figure 10B:
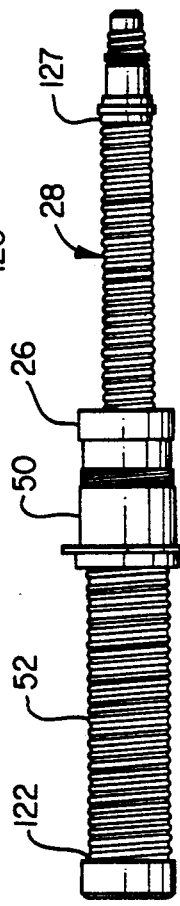
Figure 10C:
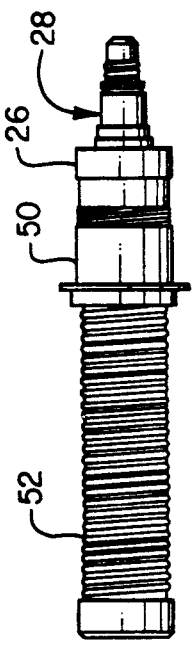

Referring now to the drawings, wherein like reference numerals designate like or corresponding parts throughout the several views, and in particular to FIG. 1, an actuator 10 is illustrated which forms a first embodiment of the present invention. The actuator 10 is mounted between a reaction element, in this case an aircraft wing 12, and a moving element, in this case a pylon 14 (FIG. 2). The pylon mounts the rotor of the tilt rotor aircraft and its powerplant. The actuator 10 is operated as will be described in detail hereinafter, to move between a retracted position 16 and an extended position 18, thereby moving the pylon and rotor between the aircraft mode and the helicopter mode, respectively. As will also be described hereinafter, the actuator 10 is jam resistant and is provided with dual or redundant load paths for enhanced safety.

With reference to FIG. 6, the basic structure of actuator 10 will be described. Actuator 10 is a dual ball screw actuator which includes an inner ball screw drive unit 20 and an outer ball screw unit 22, both of which are actuated to move the actuator between the fully retracted and fully extended positions. The use of dual drive units provides a fail/safe mode should one of the screw drive units jam, the other drive unit can remain operable for a reduced range of motion of the actuator.

With references to FIGS. 6-11, the inner ball screw drive unit 20 can be seen to include an inner ball screw assembly 24 and an inner nut 26. The inner ball screw assembly 24 includes a concentric inner ball screw 28 and an inner tube 30. The outer surface of the inner ball screw 28 is provided with a helical ball track 32. The inner surface of inner nut 26 is provided with a similar ball track 34. A plurality of actuator balls 36 are engaged between the ball tracks of the nut 26 and screw 28. The inner nut 26 captures the balls 36 for recirculation. If the nut 26 rotates relative to the screw 28, the nut and screw will move axially relative one another along axis 38.

The inner tube 30 forms a significant aspect of the present invention. The inner ball screw 28 has ends 40 and 42. The tube 30 has shoulders 44 and 46 which extend around the ends 40 and 42, respectively. Therefore, if a crack develops in inner ball screw 28, the load normally carried through the inner ball screw can be carried through the tube 30, providing a redundant or dual load path. Preferably, the inner ball screw 28 is formed of metal and the tube 30 is formed of a carbon fiber composite for lightness and strength.

The outer ball screw drive unit 22 includes an outer ball screw assembly 48. Outer ball screw assembly 48 includes an outer nut 50, an outer ball screw 52, and an outer tube 54. Outer nut 50 has a ball track 56 formed on its interior surface while outer ball screw 52 has a ball track 58. As with inner ball screw assembly 24, a plurality of balls 36 are captured within the outer nut so that relative rotation between the outer nut 50 and outer ball screw 52 about the axis 38 will cause relative axial motion between the nut and screw. As with inner tube 30, the outer tube 54 extends along the outer ball screw 52 with the ends 60 and 62 of outer ball screw 52 confined by shoulders 64 and 66 on the outer tube 54 to provide a redundant or dual load path for the outer ball screw assembly. Again, outer ball screw 52 is preferably formed of metal, while the outer tube 54 is a carbon fiber composite.

With reference specifically to FIG. 6, the operation of the actuator can be better described. The outer ball screw 52 is secured at one end to the inner nut for joint rotation about axis 38. The outer nut 50 is mounted for rotation about the axis 38 in a thrust ring 68 between roller thrust bearings 70 and 72. An annular drive gear 74 is formed as part of or mounted on the outer nut 50. A first hydraulic drive motor assembly 76 and a second hydraulic motor drive assembly 78 are provided to rotate the gear 74 and outer nut about the axis 38. Each hydraulic motor drive assembly is provided with a hydraulic motor 80, a hydraulic brake 82, suitable solenoid operated control valves 84, and are connected to separate hydraulic supplies 86 and 88. Each hydraulic motor 80 has a drive shaft 90 and a drive gear 92 to engage drive gear 74. The thrust ring 68, as best seen in FIGS. 2-5, is pivotally mounted to the wing 12 of the aircraft between forks on a conversation actuator spindle 150 for pivotal motion about both axis 152 and axis 154.

A lug 94 is pivotally mounted to the pylon, also as seen in FIGS. 2-5. The lug receives a first end 96 of the inner ball screw 28, which fixes the inner ball screw 28 relative to the lug along axis 38, but permits rotation of the inner ball screw 28 about axis 38 relative to the lug 94. As best seen in FIG. 6, the first end 96 of the inner ball screw 28 is provided with a worm wheel 98 which engages a worm gear 100 mounted for rotation in the lug 94 about an axis 102 perpendicular axis 38. The shaft 104 on which the worm gear 100 is fixed extends to gears 106 and 108. Gear 106 is engaged by the drive shaft of an electric motor 110 which has an internal motor brake 112. Gear 108 is engaged with a second motor brake 114.

In normal operation, the motor brakes 112 and 114 will be activated to prevent rotation of the worm gear 100 and thus prevent the inner ball screw 28 from rotating about axis 38. Rotation of one or both of the hydraulic motors 80 will cause rotation of the outer nut 50 about axis 38. Because inner ball screw 28 is fixed, axial displacement will occur between the outer nut 50 and the inner ball screw 28 along axis 38 to pivot the pylon 14 relative the aircraft wing 12.

In moving between the fully retracted and fully extended positions, both nuts will run the complete length of the screws with which they are engaged. However, as the actuator moves between these limits, at any given position, the outer ball screw could be moving through the outer nut, the inner nut could be moving along the inner ball screw, or both motions occurring simultaneously. Under ideal conditions, it would be expected that the inner nut would run along the inner ball screw through its full range of motion and the outer ball screw would then move through the outer nut through its full range of motion in moving from the retracted to the extended position. The pylon can be stopped and held at any position between full retraction and extension by a combination of controlling the motors and applying all brakes 82, 112 and 114.

The motion of the nuts and screws are limited by a plurality of stops in the actuator. A stop 120 is mounted on the outer ball screw 52 to engage the outer nut when the actuator is in the fully retracted position. A stop 122, at the opposite end of the outer ball screw 52, engages the outer nut 50 when the outer ball screw assembly 48 is fully extended. When stop 122 engages the outer nut 50, the engagement is made with sufficient force to ensure joint rotation of the outer nut 50, outer ball screw 52 and inner nut 26 to ensure operation of the inner ball screw assembly.

Similarly, a stop 124 (not shown) is mounted at the end 126 of inner ball screw 28 opposite end 96 to limit the motion of the inner nut in the extended position of the inner ball screw assembly. A stop 127 is mounted at end 96 to limit the motion of the inner nut at the retracted position of the inner ball screw assembly.

The actuator 10 provides significant advantages in reliability and versatility. Each of the hydraulic motor drive assemblies 76 and 78 is designed to operate the actuator alone. Should both of those assemblies fail, hydraulic brakes in each of the motor 80 will automatically engage to prevent rotation of the outer nut 50. The brakes 112 and 114 can then be released and the electric motor 110 activated to operate the actuator from the reverse end of the actuator. Thus, dual failure mode redundancy is provided.

Should one of the ball screw assemblies jam at any position, the other ball screw assembly will still be available for moving the actuator through the entire range of motion provided by that ball screw assembly. For example, in an application where the actuator operates the pylon of a tilt rotor aircraft, operation of a single ball screw assembly will permit the rotor to be moved from the aircraft mode position to a position intermediate the aircraft mode and helicopter mode to allow the aircraft to land without the rotors hitting the ground.

The dual or redundant load path provided by the composite tubes 30 and 54 is also a significant advantage of the present invention. As noted previously, should one of the ball screws fail, the load can be carried by the associated concentric tube to prevent total failure of the actuator 10. Even if the failure of a ball screw jams the associated ball screw assembly, the remaining ball screw assembly can be utilized to provide limited motion of the pylon.

In one actuator 10 constructed in accordance with the teachings of the present invention, the actuator is designed to move 44 inches between the retracted position and the extended position. In mounting between the aircraft wing and pylon, this motion pivots the pylon on conversion spindle 160 about its conversion axis 128 through an arc of about 90°, providing a 45° arc of motion for each of the ball screw assemblies. When both hydraulic motors are operable, the actuator is designed to move 3.6 inches per second.

While not illustrated, the pylon engages fixed stops on the wing at the limits of its motion. The actuator 10 can be utilized to provide a significant force on the pylon to hold the pylon against one of those stops to reduce vibration, particularly in the aircraft mode. For example, the hydraulic motors 80 can be continuously actuated to load the actuator and provide a 13,000 lb. force urging the pylon against the stop mounted on the wing in the aircraft mode.

Figure 11:
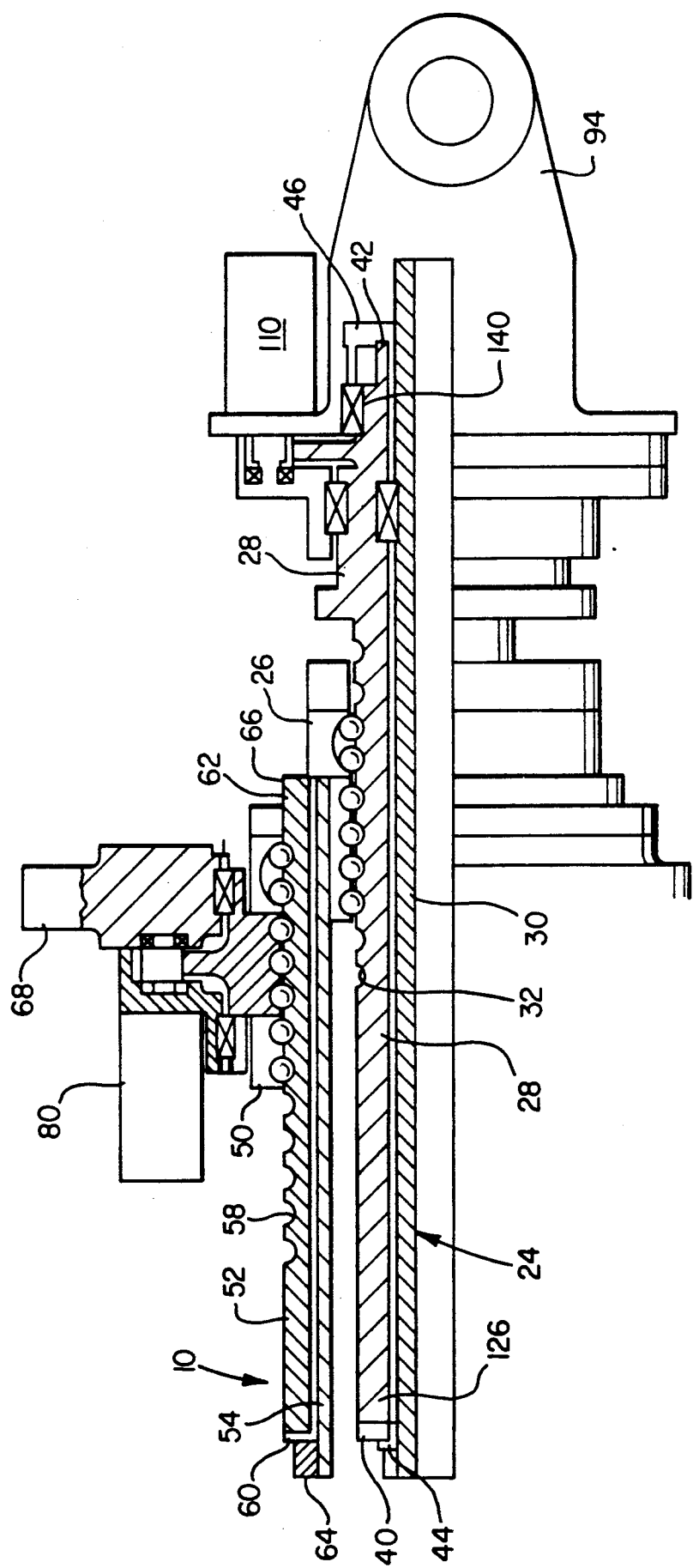
FIG. 11 is an illustrative cross sectional view of a modification of the actuator.

FIG. 11 shows a modification of the actuator 10 which, in many respects, is identical to that described previously and is therefore identified with the same reference numerals. However, motor 110 can be seen to rotate an annular gear 140 attached to the first end 96 of the inner ball screw, thereby substituting for the worm wheel and worm gear construction as discussed previously.

While only one embodiment of the invention has been illustrated in the accompany drawings and described in the foregoing Detailed Description, it will be understood that the invention is not limited to the embodiment disclosed, but is capable of numerous rearrangements, modifications, and substitutions of parts and elements without departing from the spirit of the invention.

I claim:

1. A ball screw actuator positioned between a first element and a second element, comprising:
    a first ball screw drive unit including a first nut having a ball track and a first screw having a ball track and a plurality of drive balls engaged in the ball tracks of said first nut and first screw to support the nut and screw concentric to one another about a first axis, relative rotation between the first nut and first screw about the first axis causing relative movement therebetween along the first axis;
    a second ball screw drive unit including a second nut having a ball track and a second screw having a ball track and a plurality of drive balls engaged in the ball tracks of said second nut and second screw to support the second nut and second screw concentric to one another about a second axis, relative rotation between the second nut and second screw about the second axis causing relative movement therebetween along a second axis; and
    the first nut being rotatably mounted to said first element for rotation about the first axis, said second screw being rotatably mounted to said second element for rotation about the second axis, said first screw and second nut being secured together with the first and second axis coincident for joint rotation about the coincident axis; and
    means for providing a redundant load path independent of said first screw so that failure of said first screw will not compromise the load carrying capacity of the ball screw actuator between said first element and said second element.

2. The ball screw actuator of claim 1 further comprising a brake mounted on the second element to prevent rotation of the second screw about the coincident axis; and
    a motor mounted on the first element for rotating the first nut about the coincident axis to extend and retract the actuator.

3. The actuator of claim 2 further comprising a brake mounted on the first element for preventing rotation of the first nut about the coincident axis; and
    a motor mounted on the second element for rotating the second screw about the coincident axis.

4. The actuator of claim 1 wherein the first element is a wing and the second element is a pylon, the actuator movable between a retracted position and an extended position, the pylon being in an aircraft mode in the retracted position and in a helicopter mode in the extended position.

5. A ball screw actuator positioned between a first element and a second element, comprising:
    a first nut having a ball track;
    a first screw having first and second ends and further having a ball track;
    a plurality of balls engaged in the ball tracks of said first nut and first screw to support the first nut and first screw concentric to one another about a first axis, relative rotation between the first nut and first screw about the first axis causing relative movement therebetween along the first axis;
    a second nut having a ball track;
    a second screw having first and second ends and further having a ball track;
    a plurality of balls engaged in the ball tracks of said second nut and second screw to support the second nut and second screw concentric to one another about the first axis, relative rotation between the second nut and second screw abut the first axis causing relative movement therebetween along the first axis, one of said first nut and first screw being connected to one of said second nut and second screw; and
    a member extending the length of the first screw and having first and second shoulders extending about the first and second ends of the first screw, respectivley, to provide a redundant load path between the first and second elements.

6. The ball screw actuator of claim 5 wherein the member is a carbon fiber composite.

7. The ball screw actuator of claim 5 further comprising a member extending the length of the second screw and having first and second shoulders extending about the first and second ends of the second screw, respectivley, to provide a redundant load path between the first and second elements.

* * * * *